C. VALLONE & F. R. ROGERS.
APPARATUS FOR HEATING TUBES, RODS, OR THE LIKE.
APPLICATION FILED FEB. 21, 1911.
1,033,497.
Patented July 23, 1912.
3 SHEETS—SHEET 1.
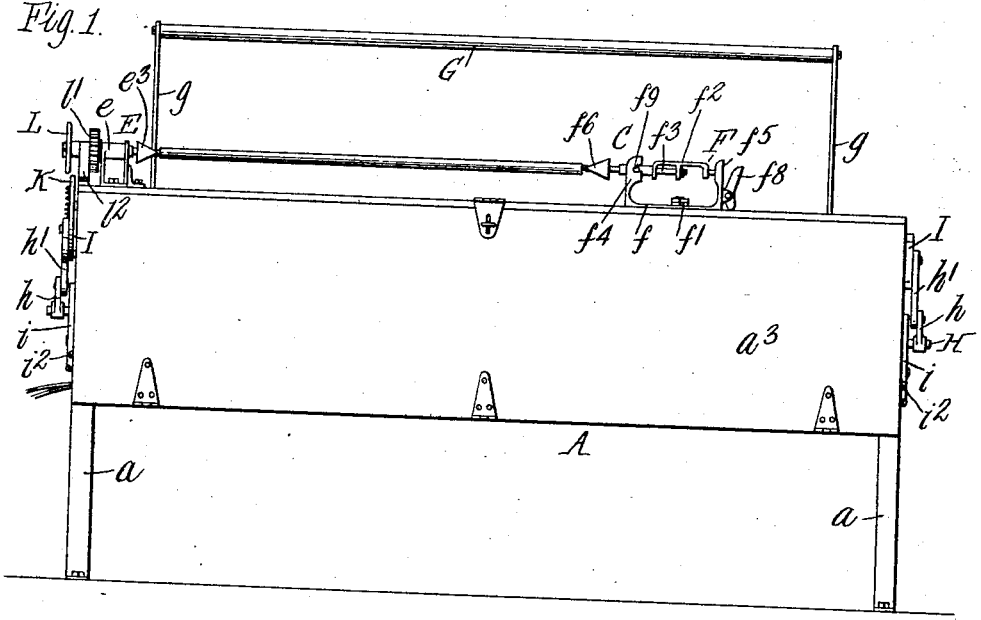
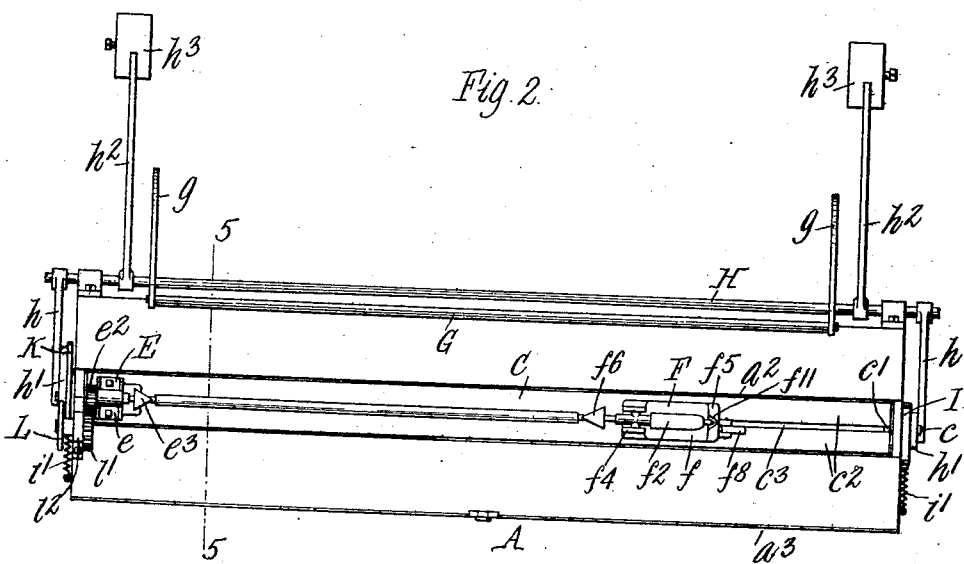
Witnesses
C. H. Bund.
A. G. Dimond.
Inventors.
Charles Vallone,
Frank R. Rogers,
By Wilhelm, Parker & Hard,
Attorneys C. VALLONE & F. R. ROGERS.
APPARATUS FOR HEATING TUBES, RODS, OR THE LIKE.
APPLICATION FILED FEB. 21, 1911.
1,033,497.
Patented July 23, 1912.
3 SHEETS—SHEET 2.
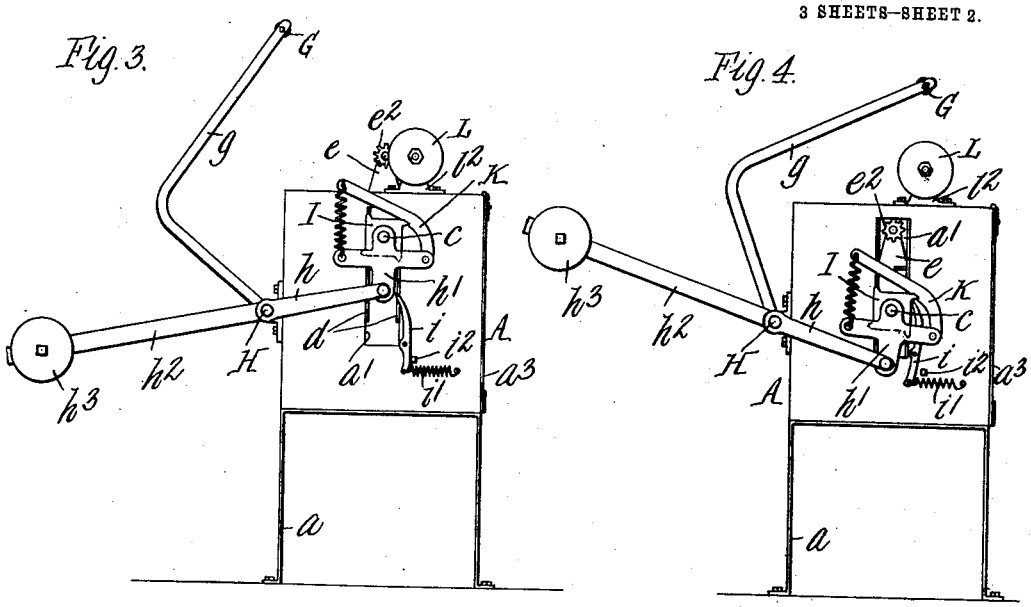
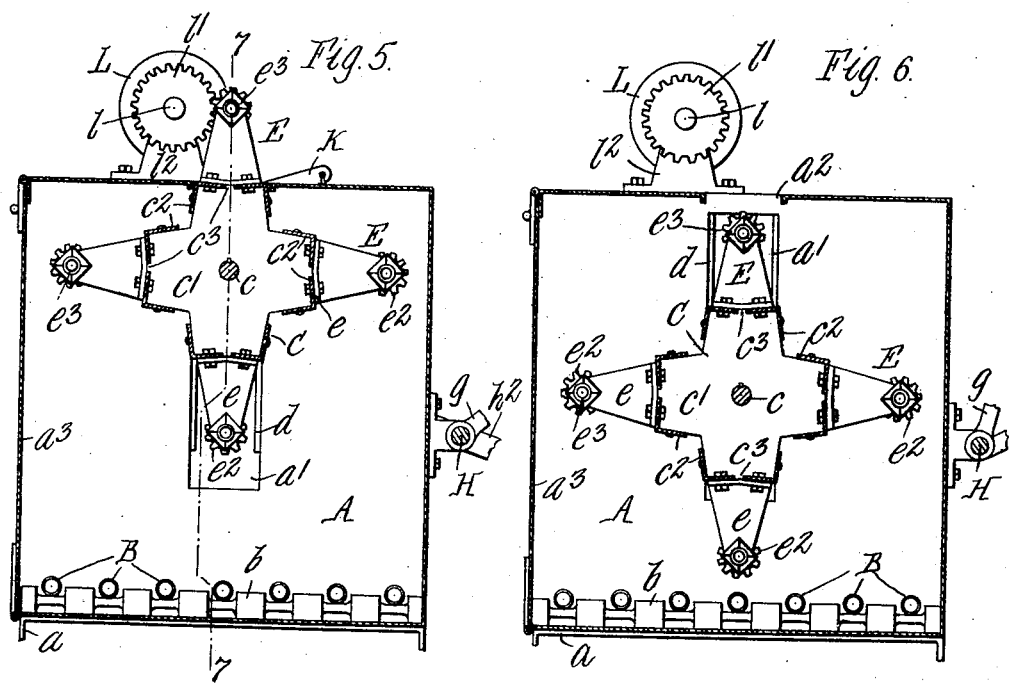
Witnesses.
Inventors.
Charles Vallone,
Frank R. Rogers,
By Wilhelm, Parker & Hard.
Attorneys.

C. VALLONE & F. R. ROGERS.
APPARATUS FOR HEATING TUBES, RODS, OR THE LIKE.
APPLICATION FILED FEB. 21, 1911.
1,033,497.
Patented July 23, 1912.
3 SHEETS—SHEET 3.
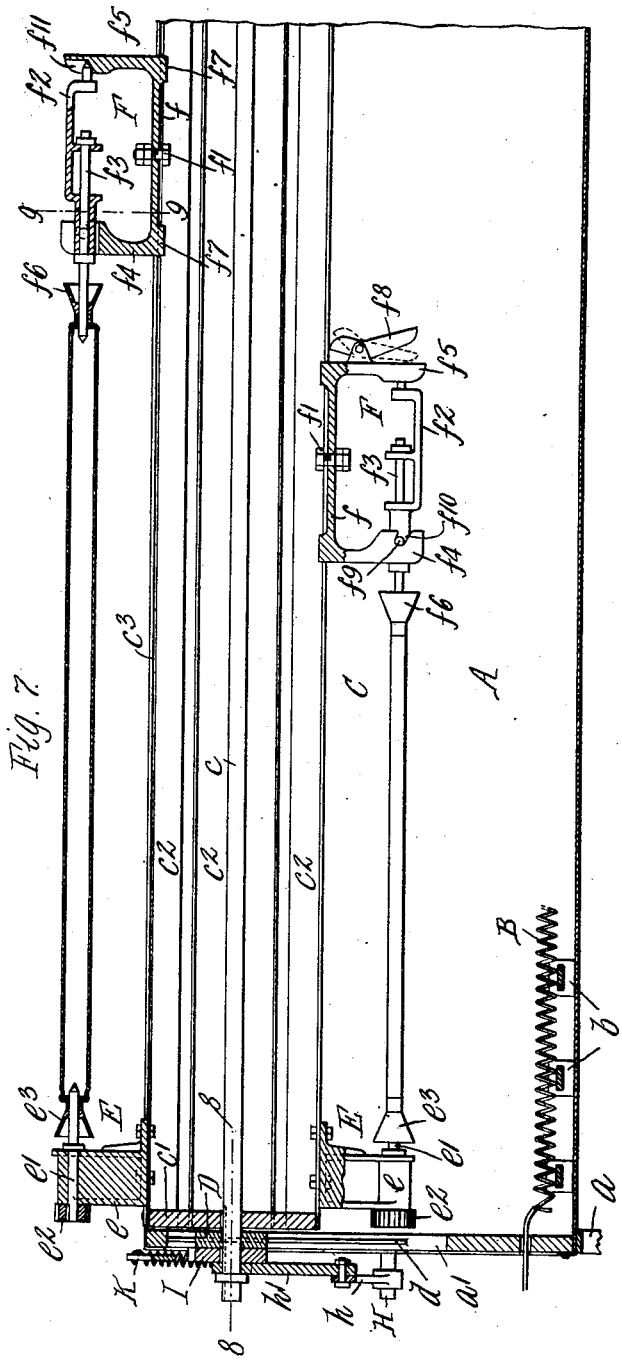
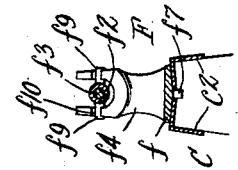
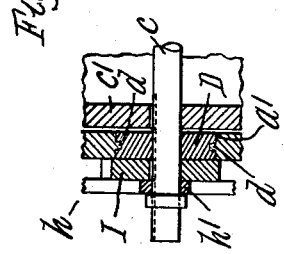
Witnesses.
Inventors.
Charles Vallone,
Frank R. Rogers,
By Wilhelm, Parker & Hard,
Attorneys.

UNITED STATES PATENT OFFICE.

CHARLES VALLONE AND FRANK R. ROGERS, OF BUFFALO, NEW YORK, ASSIGNORS TO BARCALO MANUFACTURING COMPANY, OF BUFFALO, NEW YORK.

APPARATUS FOR HEATING TUBES, RODS, OR THE LIKE.

1,033,497. Specification of Letters Patent. Patented July 23, 1912.

Application filed February 21, 1911. Serial No. 609,850.

*To all whom it may concern:*

Be it known that we, CHARLES VALLONE and FRANK R. ROGERS, citizens of the United States, residing at Buffalo, in the county of Erie and State of New York, have invented a new and useful Improvement in Apparatus for Heating Tubes, Rods, or the Like, of which the following is a specification.

This invention relates to apparatus for heating tubes, rods, or other articles of analogous shape.

The apparatus is primarily intended for heating brass tubes which are used in the manufacture of bedstead frames and maintaining them at a suitable temperature while they are being lacquered to thereby facilitate the lacquering operation, but the apparatus may be used for heating tubes or analogous articles for any other purpose.

The objects of the invention are to produce an apparatus for the purpose stated which is adapted to hold a number of the tubes or other articles at one time in such a way that while one is held in position to be operated upon, the others are being heated, thereby eliminating the delay caused by waiting for the tubes to become heated to the required temperature; also to construct the apparatus so as to maintain the tube or article at the desired temperature while it is being operated upon; also to produce a simple, reliable and efficient apparatus which will be easy to operate and will greatly reduce the amount of time and labor required to lacquer tubes or analogous articles.

For the sake of brevity, the articles to be operated upon will be referred to hereinafter as "tubes," but this term will be understood to mean either a tube, rod or other article of analogous shape.

Briefly stated, the apparatus comprises a heating chamber or oven, provided with suitable means for heating it, and a movable carrier in the heating chamber adapted to support a plurality of tubes. The carrier is mounted so that it is adapted to be raised to elevate one of the tubes through a slot in the top of the heating chamber and support it over the heating chamber in position to be lacquered. The other tubes on the carrier are retained in the heating chamber and are being heated while the exposed tube is being lacquered. After lacquering the exposed tube it is removed from the carrier and replaced by another tube and the carrier is then lowered to carry the new tube into the heating chamber. When the carrier is lowered it is partially turned by suitable means to bring the next tube thereon in position to be elevated through the slot in the top of the heating chamber. The tubes are thus brought successively into position for lacquering them by the intermittent operation of the carrier, so that each tube remains in the heating chamber and is being heated during the time that several tubes are being lacquered, and thus has ample time to become heated to the required temperature without requiring the operator to wait for the tubes to heat.

In the accompanying drawings, consisting of three sheets: Figure 1 is a front elevation of an apparatus embodying the invention. Fig. 2 is a plan view thereof. Figs. 3 and 4 are end elevations thereof showing the movable parts of the apparatus in different positions. Figs. 5 and 6 are fragmentary transverse sectional elevations, on an enlarged scale, on line 5—5, Fig. 2, showing the movable parts in different positions. Fig. 7 is a fragmentary longitudinal sectional elevation on an enlarged scale, on line 7—7, Fig. 5. Fig. 8 is a section on line 8—8, Fig. 7, on a still larger scale. Fig. 9 is a fragmentary sectional elevation of the tube carrier, on line 9—9, Fig. 7.

Like reference characters refer to like parts in the several figures.

A represents the heating chamber or oven, which may be of any suitable shape and construction, that shown in the drawings being of rectangular box-shape and provided with suitable legs or supports $a$. The end walls of the chamber are provided with vertical slots or openings $a'$ and the top thereof is provided with a longitudinal slot or opening $a^2$. The front wall $a^3$ is preferably hinged in any suitable manner to afford access to the chamber. Any suitable means may be employed for heating the chamber A, such, for instance, as electrically heated resistance coils B, which are located in the bottom of the heating chamber and rest on suitable insulating supports $b$.

C represents the tube carrier, which is mounted to rotate and move vertically within the heating chamber A and is provided with means for holding a plurality of tubes to be heated. In the construction shown, the tube carrier C comprises a central shaft $c$ extending longitudinally through the heating chamber, and two end pieces $c'$ $c'$ which are secured to the shaft $c$ near the opposite end walls of the heating chamber A and have outwardly extending arms connected by bars or members $c^2$ which extend parallel to the shaft $c$ and upon which the means for holding the tubes are secured. The bars $c^2$ used are preferably angle bars, arranged in pairs with their laterally extending flanges spaced a short distance apart, leaving a slot or opening $c^3$ between them. The sides of the arms of the end pieces $c'$ converge outwardly, and the inwardly extending flanges of the angle bars $c^2$, which are secured to these sides, also converge in the same direction, which greatly facilitates the entrance of the arms and angle bars into the slot $a^2$ in the top of the heating chamber when the tube carrier is elevated. The ends of the tube carrier shaft $c$ are journaled in bearing boxes D, arranged to slide vertically on the end walls of the heating chamber A, whereby the tube carrier is adapted to be turned and raised and lowered in the heating chamber. The bearing boxes shown are located in the vertical slots $a'$ and are guided by tongues $d$, Fig. 8, on the sides of the slots entering grooves in the bearing boxes.

Supports or holders E and F for the opposite ends of the tubes to be heated are suitably mounted on the bars $c^2$ of the tube carrier C, one of the holders for each tube being preferably adjustable on the bars $c^2$ to permit the distance between the holders to be varied as required to hold tubes of different lengths. Each of the supports E shown for one end of the tubes comprises a bearing or bracket $e$ which is bolted or otherwise rigidly secured to two adjacent angle bars $c^2$, and has a short shaft $e'$ journaled in its outer portion. At one end of this shaft a gear wheel $e^2$ is rigidly secured, while on the other end a center or tip $e^3$ for engaging and holding the tube is secured. This center may be of any suitable construction, depending upon the shape of the tube or article to be heated. A substantially pyramidal center is shown in the drawings which is adapted to hold round or square tubes of various diameters.

Each of the adjustable tube holders F comprises a base $f$ which is adjustably secured to the angle bars $c^2$, for instance by a bolt $f'$ passing through the slot $c^3$ between the angle bars, and a center bearing $f^2$ in which is journaled a center shaft $f^3$ and which is removably secured in the outwardly projecting end posts $f^4$ and $f^5$ of the base $f$. The shaft $f^3$ is provided at its inner end with a center $f^6$ similar to the center $e^4$ for entering the end of the tube. The base $f$ has guide lugs $f^7$ entering the slot $c^3$, and is provided with a securing dog or lever $f^8$. This dog or lever does not prevent the free movement of the holder F toward the holder E, but one end thereof is adapted to frictionally engage one of the bars $c^2$ and prevent movement of the holder F away from the holder E. The outer end of the end post $f^4$ is bifurcated and one end of the center bearing $f^2$ rests in this bifurcated part and is provided with lateral pins $f^9$ which enter inclined slots $f'^\circ$ in the opposite sides of the bifurcated part of the post, while the opposite end of the center bearing $f^2$ is seated in a slot $f''$ in the outer end of the end post $f^5$. In order to secure the center bearing $f^2$ on the base $f$, the pins $f^9$ are first inserted into the inclined slots $f'^\circ$ and the opposite end of the bearing is then placed into the slot $f''$. When the holder F is moved inwardly toward the tube to hold the same between the two centers, and is locked in its inner position by the dog $f^8$, the center bearing $f^2$ will be held in place on the base $f$. When it is desired to remove the tube, the center bearing $f^2$ and tube may be removed together so that the freshly lacquered tube need not be handled.

The described tube holding or securing devices have proved satisfactory and desirable, but any other means for removably securing the tubes in place on the tube carrier could be employed. The tube carrier illustrated is adapted to hold four tubes, but a carrier adapted to hold a greater or less number of tubes can be used if desired.

The following means are shown for raising and lowering the tube carrier F to elevate the tubes out of the heating chamber for lacquering them and lowering the new tubes into the heating chamber: G represents an operating rod or handle which extends lengthwise over the heating chamber and is connected by bent arms $g$ at its ends to a rock-shaft H which is suitably journaled on the rear side of the heating chamber. This rock-shaft is provided at the ends of the heating chamber with arms $h$, which are connected by links $h'$ to the projecting ends of the shaft $c$ of the tube carrier. By moving the handle G from the position shown in Fig. 4 to that shown in Fig. 3, the tube carrier is raised, and by returning the handle the tube carrier is again lowered. $h^2$ represents arms projecting from the rock-shaft H and provided with adjustable counterbalancing weights $h^3$ for the tube carrier. I represents toothed or ratchet wheels which are rigidly secured on the tube carrier shaft $c$ outside of the heating chamber A and are provided with teeth corresponding in number to the tube supports on the tube carrier C. The teeth of each ratchet wheel are adapted to be engaged by a pawl $i$, pivoted on the adjacent end of the heating chamber, and normally held by a spring $i^7$, or other means, against a stop $i^2$ which is so located that the pawl will engage with one of the teeth and partially turn the wheel upon each downward movement of the ratchet wheel with the tube carrier. The pawl will turn the ratchet wheel and the tube carrier C to which it is connected through an angle equal to the angle between the tubes thereon, so that each time the carrier is lowered to carry a new tube into the heating chamber it will be turned to place the next tube in position to be elevated through the slot $a^2$ into position for lacquering it when the carrier is next raised. In order to prevent the turning of the tube carrier when the ratchet wheels are out of engagement with the pawl $i$, a suitable spring-actuated detent K is provided, which is adapted to engage with the teeth of one of the ratchet wheels I and yieldingly hold the same against movement. The detent K is pivotedly mounted on the adjacent link $h'$. Any other suitable mechanism for raising and lowering and intermittently turning the tube carrier may be employed.

In order to enable the tubes to be turned about their axes to place the different sides thereof in convenient position for lacquering, a hand wheel L connected by a shaft $l$ to a gear $l'$ is provided. The shaft is suitably journaled in a bearing or standard $l^2$ on the top of the heating chamber. When the tube carrier C is raised into its upper position, the gear wheel $e^2$ on the center shaft $e'$ for the tube which is elevated through the slot $a^2$ is placed in mesh with the gear $l'$ and on turning this gear by means of the hand wheel L, the shaft $e'$, center $e^3$ and the tube are revolved. The operator can readily turn the hand wheel L with one hand while using the other hand to lacquer the tube.

In the operation of the apparatus, when the tube carrier is raised to elevate a tube into position over the heating chamber for lacquering it, the bars $c^2$ of the carrier beneath the tube enter the slot $a^2$ in the top of the heating chamber and close it except for the narrow slot $c^3$ between the bars $c^2$. Thus after a tube has been heated to the desired temperature in the chamber A and is raised out of the chamber to be lacquered, it is maintained at this temperature by a current of heated air passing upwardly from the heating chamber through the slot $c^3$, which is located directly under the tube. When the operator has finished lacquering a tube, he removes it from the tube supports E and F, puts a cold tube in its place and lowers the tube carrier, thereby carrying the cold tube into the heating chamber and rotating the carrier as described, so that when it is again raised another tube will be presented for lacquering. This operation is repeated for each tube. By the time the operator has lacquered the other tubes supported on the tube carrier C, the cold tube will be heated to the required temperature and will be ready for lacquering, so that no time is wasted in waiting for the tubes to become sufficiently heated.

We claim as our invention:

1. In an apparatus of the character described, the combination of a heating chamber having an opening, a movable carrier located in said heating chamber and adapted to support a plurality of articles therein, means for operating said carrier to move said articles in one direction and bring the same successively opposite to said opening, and means for moving said articles one at a time in another direction through said opening and supporting them outside of said heating chamber in a position to permit the article to be operated upon, substantially as set forth.

2. In an apparatus of the character described, the combination of a heating chamber having an opening in the top thereof, a movable carrier located in said heating chamber and adapted to support a plurality of articles therein, and means adapted to be actuated at will for operating said carrier to elevate said articles one at a time through said opening and support the article in a stationary position outside of said heating chamber and above said opening therein to permit the article to be operated upon, whereby the heat escaping through said opening will prevent the cooling of the article while the same is being operated upon, substantially as set forth.

3. In an apparatus of the character described, the combination of a heating chamber having an opening and a rotatable carrier located within said chamber and adapted to support a plurality of articles, and means for rotating said carrier to place the articles in succession opposite to the opening in said heating chamber and then reciprocating it to move said articles through said opening and support them outside of said heating chamber in a position to be operated upon, substantially as set forth.

4. In an apparatus of the character described, the combination of a heating chamber having an opening, a rotatable carrier having means for supporting a plurality of articles, and means for revolving said carrier within said chamber to place said articles in succession opposite to said opening and for moving the articles through said opening and supporting them in a position to be operated upon outside of the heating chamber, substantially as set forth.

5. In an apparatus of the character described, the combination of a heating chamber having an opening, a rotatable carrier having means for supporting a plurality of articles, means for revolving said carrier within said chamber to place said articles in succession opposite to said opening, and means for reciprocating said carrier in said heating chamber toward and from said opening to move the articles through said opening and supporting them in a position to be operated upon outside of the heating chamber, substantially as set forth.

6. In an apparatus of the character described, the combination of a heating chamber having an opening, a rotatable carrier having means for supporting a plurality of articles, means for revolving said carrier within said chamber to place said articles in succession opposite to said opening, means for holding said carrier in said position, and means for reciprocating said carrier to move said articles in succession through said opening into a position to be operated upon outside of said heating chamber, substantially as set forth.

7. In an apparatus of the character described, the combination of a heating chamber having an opening, a rotatable carrier for supporting a plurality of articles, bearings in which said carrier is journaled and which are movably mounted on said chamber, means for moving said carrier toward and from said chamber, and means which operate to turn said carrier intermittently in said bearings, substantially as set forth.

8. In an apparatus of the character described, the combination of a heating chamber having an opening, an intermittently rotatable carrier located within said heating chamber, a plurality of holders mounted on said carrier for rotatably supporting said articles, means for reciprocating said carrier to successively project said holders through said opening to support said articles in a position outside of the heating chamber, and means for revolving said articles while in position outside of said chamber, substantially as set forth.

9. In an apparatus of the character described, the combination of a heating chamber having an opening, a carrier located within said heating chamber, a plurality of pairs of holders mounted on said carrier, each of said pairs of holders being adapted to support an article and one holder of each pair being adjustable toward and from the other holder, and means for projecting said pairs of holders successively through said opening, substantially as set forth.

10. In an apparatus of the character described, the combination of a heating chamber having an opening in its top, a carrier adapted to support a plurality of articles in said heating chamber, and means for operating said carrier to elevate said articles in succession through said opening and support them over the opening, said carrier having means for restricting said opening to a narrow opening beneath the elevated article, substantially as set forth.

11. In an apparatus of the character described, the combination of a heating chamber having an opening, a carrier provided with holding means adapted to support a plurality of articles in said heating chamber, the holding means for each article having a part which engages the article and which is detachable with the article from said carrier, and means for operating said carrier to move said articles in succession through said opening and support them outside of the heating chamber in position to be operated upon, substantially as set forth.

12. In an apparatus of the character described, the combination of a heating chamber having an opening, a carrier rotatably mounted in said heating chamber and adapted to support a plurality of articles, means for reciprocating said carrier to carry the articles out of and into the heating chamber through said opening, and ratchet and pawl mechanism which operate to partially rotate said carrier when it is moved to carry the article into the heating chamber, substantially as set forth.

13. In an apparatus of the character described, the combination of a heating chamber having an opening, a carrier rotatably mounted in said heating chamber and adapted to support a plurality of articles, a lever and connections for reciprocating said carrier to carry the articles out of and into the heating chamber through said opening, and means for intermittently rotating said carrier, substantially as set forth.

Witness our hands, this 14th day of February, 1911.

CHARLES VALLONE.
FRANK R. ROGERS.

Witnesses:
A. W. KIRTON,
C. L. HYSLOP.